(12) United States Patent
Jackson et al.

(10) Patent No.: US 12,351,341 B2
(45) Date of Patent: Jul. 8, 2025

(54) AUTOMATED CLAMP

(71) Applicant: AIRBUS OPERATIONS LIMITED, Bristol (GB)

(72) Inventors: Anthony Jackson, Bristol (GB); Michael Redman, Bristol (GB); David Cantle, Bristol (GB); Matthew Foster, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 419 days.

(21) Appl. No.: 17/244,328

(22) Filed: Apr. 29, 2021

(65) Prior Publication Data

US 2021/0339888 A1  Nov. 4, 2021

(30) Foreign Application Priority Data

Apr. 30, 2020  (GB) ..................................... 2006394

(51) Int. Cl.
*B64F 5/10* (2017.01)
*B25J 9/16* (2006.01)

(52) U.S. Cl.
CPC .............. *B64F 5/10* (2017.01); *B25J 9/1682* (2013.01); *B25J 9/1694* (2013.01)

(58) Field of Classification Search
CPC ........... B25B 5/067; B25B 5/068; B25B 5/08; B25B 5/082; B25B 5/085; B25B 5/101; B25B 5/125; B25J 9/0087; B25J 9/1682; B25J 9/1694; B25J 9/1697; B64F 5/10; B23B 47/287; B23B 2247/12; B23B 2247/10; B23B 47/28; F16B 2/12; F16B 5/004; F16B 5/0064; B62D 65/02–028; B23P 2700/01

See application file for complete search history.

(56) References Cited

U.S. PATENT DOCUMENTS 4,548,345 A  10/1985 Puritz et al.
4,955,119 A *  9/1990 Bonomi ............... B25J 15/0019
                                                         901/41

(Continued)

FOREIGN PATENT DOCUMENTS

CN  108942917 A  12/2018
CN  110303494 A  10/2019

(Continued)

OTHER PUBLICATIONS

Combined Search and Examination Report for GB Application No. 2006394.7 dated Feb. 3, 2021, 12 pages.

(Continued)

*Primary Examiner* — Joel D Crandall
*Assistant Examiner* — Jonathan R Zaworski
(74) *Attorney, Agent, or Firm* — Nixon & Vanderhye P.C.

(57) ABSTRACT

An automated clamp is disclosed including a clamp frame, motorised clamp jaws, and a robot end effector connector. One of the clamp jaws can receive a drilling tool and/or a fastening tool. One of the clamp jaws has a position sensor for detecting a position of the clamp. The clamp forms part of an automated clamping system. The clamping system is used to automatically clamp a rib web to a rib post or integrated rib foot of an aircraft wing box for automated drilling and/or fastening the rib web to a rib post or integrated rib foot.

19 Claims, 8 Drawing Sheets

(56) References Cited

U.S. PATENT DOCUMENTS

| | | | | |
|---|---|---|---|---|
| 6,269,527 B1 * | 8/2001 | Nelson | ............... | B23P 19/04 |
| | | | | 29/33 R |
| 6,430,796 B1 * | 8/2002 | Jones | ............... | B23P 23/00 |
| | | | | 29/34 B |
| 6,726,610 B2 * | 4/2004 | Graham | ............ | B23Q 39/021 |
| | | | | 29/33 K |
| 8,573,070 B2 * | 11/2013 | Sarh | .............. | B25J 13/086 |
| | | | | 901/34 |
| 9,061,419 B2 * | 6/2015 | Kranz | ............... | B25J 9/1633 |
| 9,162,332 B2 * | 10/2015 | Wright | ............ | B23P 23/04 |
| 9,616,503 B2 * | 4/2017 | Cardon | ............ | B25J 15/0095 |

FOREIGN PATENT DOCUMENTS

| | | |
|---|---|---|
| EP | 2 965 984 | 1/2016 |
| EP | 2 995 402 | 3/2016 |

OTHER PUBLICATIONS

Extended European Search Report for European Application No. 21170753.4, dated Aug. 27, 2021, 11 pages.

Chinese Office Action with English Translation cited in Application No. 202110466465.6 mailed Mar. 22, 2025, 21 pages.

\* cited by examiner

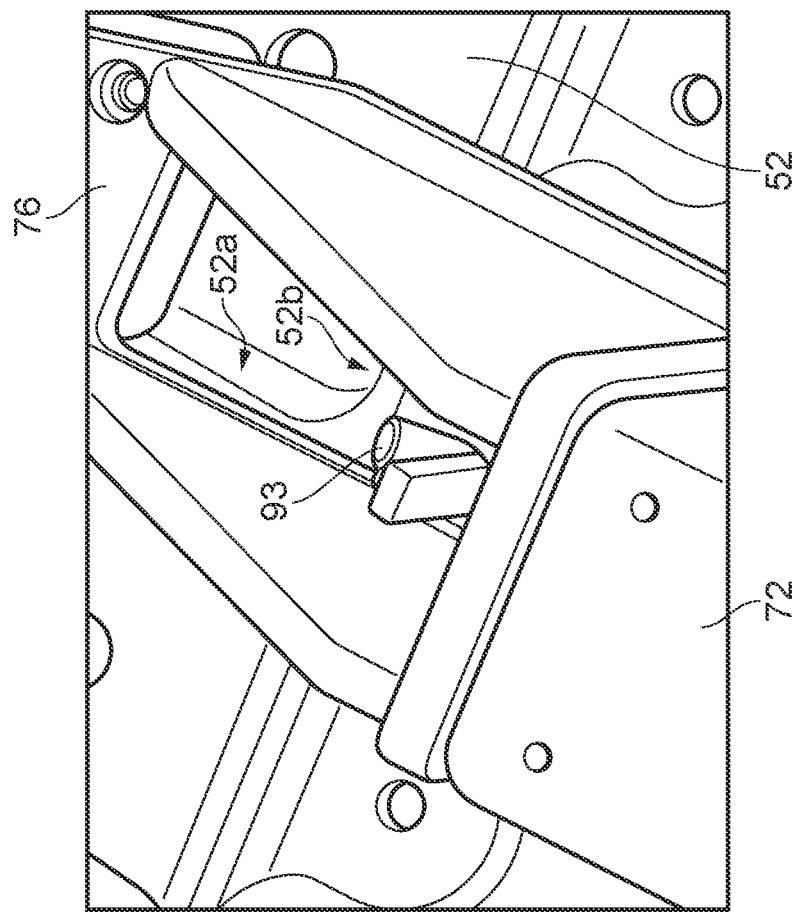
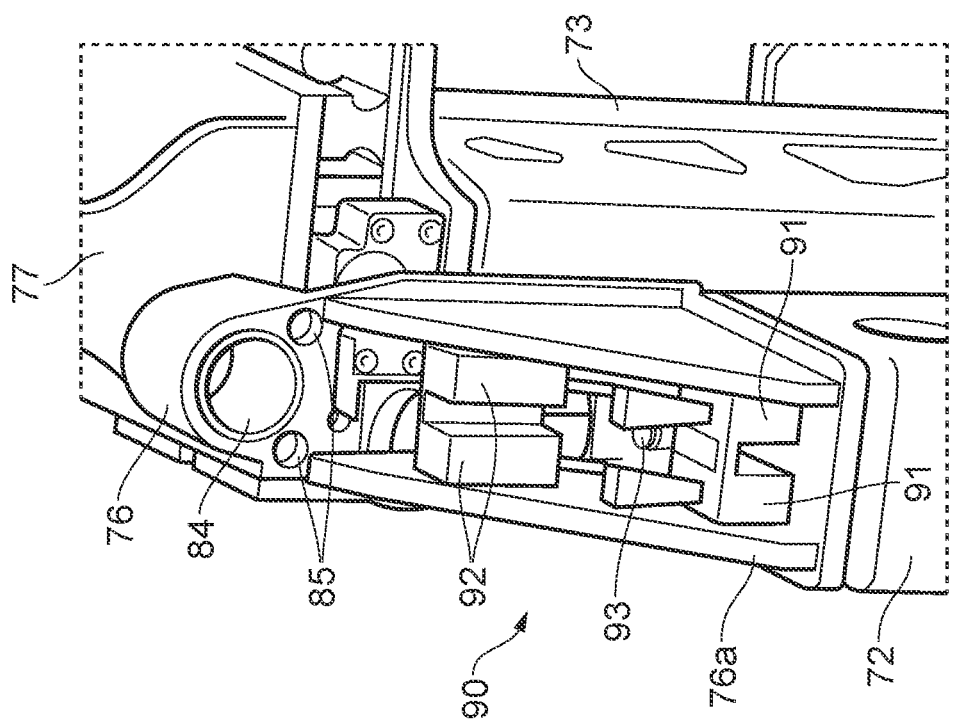

AUTOMATED CLAMP

CROSS REFERENCE TO RELATED APPLICATION

This application claims priority to United Kingdom Patent Application No. GB 2006394.7, filed Apr. 30, 2020, the entire contents of which is hereby incorporated by reference.

FIELD OF THE INVENTION

The present invention relates to an automated clamp, and to a method of automatically clamping a rib web to a rib post or integrated rib foot of an aircraft wing box for automated drilling and/or fastening the rib web to a rib post or integrated rib foot.

BACKGROUND OF THE INVENTION

A wing of an aircraft typically includes a torsion box comprising upper and lower aerofoil covers (or skins) on either side of a structural frame comprising spanwise spars and chordwise ribs. At least one spar is provided for each wing, although two or more is more common. In an aircraft wing, the torsion box is commonly known as a wing box. The covers may also be reinforced with stringers, which extend generally spanwise.

In a traditional aircraft wing box each rib is bolted to the upper and lower covers and to the front and rear spars. Each rib has a generally planar web and flanges for joining to each of the spars and covers. Assembly of such a wing box can be time-consuming and complicated due to the need to manufacture, drill, shim, and then bolt many components together.

To reduce parts count and improve assembly various improvements to the structure and manufacture of the wing box have been made. For example, the rib may be joined to the spar by a rib post. The rib post has a rib post foot joined to the spar and an upstanding rib post web for joining to the rib web. The rib post may be joined to the spar prior to assembling the wing box.

The rib may be joined to the upper or lower covers by a rib foot. The rib foot has a rib foot flange joined or integrated with the interior surface of the cover and an upstanding rib foot web for joining to the rib web. The cover may include integral stringers/stiffeners, and each rib foot may have a second flange joined or integrally formed with one of the integral stiffeners. The rib foot may be joined or integrally formed with the cover prior to assembling the wing box.

At least one of the covers may be integrated with at least one of the spars. For example, the spar and cover may be integrally formed from a composite laminate material to form a spar-cover such that the composite material of the spar extends continuously into the cover through a fold region created between the spar and the cover. The spar-cover may be Z-shaped. The spar-cover may be omega-shaped.

Despite these structural improvements, assembling the wing box still typically requires drilling of fastener holes and subsequent disassembly for cleaning and deburring the drilled holes before reassembling the components for final fastening.

It is desirable to manufacture the wing in a 'one way assembly' process. One-way assembly involves the drilling and fastening of an assembly without an intermediate step of disassembly after drilling and prior to fastening. If a clamping force is not applied then one way assembly is typically not practical, as inter-laminar burring may occur during drilling and necessitate the disassembly and cleaning before reassembly and final fastening.

To enable one way assembly of the aircraft wing, all of the ribs and spars need to be drilled and fastened to the upper and lower skin covers without removing one or other of the skin covers once assembly has begun. If any one component of the primary wing structure cannot be assembled by this one way assembly process then the benefit of the one way assembly process of reducing build time cannot be realised.

SUMMARY OF THE INVENTION

A first aspect of the invention provides an automated clamp for clamping a rib web to a rib post or integrated rib foot of an aircraft wing box, the clamp comprising: a clamp frame having a first arm and a second arm; a robot end effector connector coupled to the clamp frame; clamp jaws including a first jaw at a proximal end of one of the first and second arms, and a second jaw at a proximal end of the other of the first and second arms, wherein at least one of the clamp jaws is moveable towards and away from the other of the clamp jaws by a motor to open and close the jaws, wherein at least one of the clamp jaws is configured to receive a tool module and has an aperture through which one or more of a drilling tool and a fastening tool is insertable, and wherein at least one of the clamp jaws has at least one position sensor for detecting a position of the clamp relative to the aircraft wing box.

A further aspect of the invention provide an automated clamp system comprising the clamp according to the first aspect, a robot having an arm coupled to the end effector connector of the clamp, and a control system connected to the robot, the motorised jaws of the clamp, and to the at least one position sensor.

A yet further aspect of the invention provides a method of automatically clamping a rib web to a rib post or integrated rib foot of an aircraft wing box for automated drilling and/or fastening the rib web to a rib post or integrated rib foot, the method comprising: using a first robot to position an automated clamp having motorised jaws and at least one position sensor, wherein the first robot positions the automated clamp based on the clamp position with respect to the wing box detected by the position sensor; closing the clamp jaws by operating the motorised jaws when the clamp is in a desired position with respect to the wing box to clamp a rib web to a rib post or integrated rib foot of the aircraft wing box; and using a second robot to position a tool module in an aperture of one of the clamp jaws.

The invention is advantageous in that the clamp is sufficiently large to fit around the rib web yet with automated positioning can be carefully and accurately positioned for clamping the rib web to either a rib post or rib foot without clashing with the other components of the wing box during assembly despite the confined space available. The clamp can receive a tool module for drilling or fastening operations to join the rib web to the rib post or rib foot whilst the clamping load is applied, thereby facilitating the one-way assembly objective.

The moveable clamp jaw may include a linear rail for linear movement of the clamp jaw with respect to the clamp frame to open and close the clamp jaws.

The first clamp jaw may be fixed so as to be non-moveable with respect to the clamp frame. The second clamp jaw may be moveable with respect to the clamp frame.

The motor rotational axis may be perpendicular to the linear rail. This may reduce the space envelope of the clamp so it may be used in confined spaces.

The clamp jaws may be mounted either to the side surfaces of the arms so that the jaws are laterally offset from the plane of the clamp frame, or to the end surfaces of the arms so that the jaws are substantially in the plane of the clamp frame.

The clamp frame may be generally U-shaped. The distance between the arms may be sufficient to clear around rib feet of the rib during positioning of the clamp, with a margin for robot position tolerance and fixture position tolerance.

The clamp jaws and the clamp frame may be modular so that the jaws may be mounted to either the side surfaces or the end surfaces of the arms of a universal clamp frame. Reorienting the jaws on the clamp frame may assist with using the same clamp jaw and frame components for clamping a rib web to either a rib post or to a rib foot where different space constraints may apply. This reduces parts count of the assembly tooling.

The clamp may further comprise a loads monitoring device on the clamp frame.

The loads monitoring device may be a strain gauge in an arm of the clamp frame.

The at least one position sensor may include a first distance sensor oriented substantially along the longitudinal axis of the arm.

The at least one position sensor may include a second distance sensor oriented substantially transverse to the longitudinal axis of the arm.

The first or second distance sensors may be laser distance sensors.

The laser distance sensor may be used for initial positioning of the clamp, e.g. to a global position within +/−10 mm of a desired position. For example, the laser distance sensors may be configured to sense the distance from the interior surface of the cover and/or the surface of the rib web.

The at least one position sensor may include a vision system for detecting a datum of the rib post or integrated rib foot to be clamped. The datum may be an edge feature for example. The vision system may include a camera. The vision system may include edge detection processing of images captured by the camera to locate the edge feature on a component, e.g. an edge of a rib foot, rib web or rib post. The vision system may compare an edge feature on the clamp, e.g. an edge of a nose of one of the clamp jaws, to the edge feature on the component and allow the first robot to adjust the position of the clamp until the required positional accuracy of the clamp position with respect to the component is achieved.

The aperture may be a bore or through hole, e.g. of a chuck or collet. The bore diameter may be fixed and configured to receive an expanding chuck or collet of the tool module. Alternatively the bore diameter may be expandable and contractible to receive the tool module. The expansion and contraction of the chuck or collet may be operated automatically, e.g. by the first or second robots under the instruction of the control system. Contracting the chuck or collet may be used to securely grip and hold the tool module to the clamp jaw.

The aperture may be in one of the clamp jaws fixed so as to be non-moveable with respect to the clamp frame.

The control system may be configured to automatically position the clamp frame by manipulating the robot arm based on information received from the at least one position sensor.

The control system may be configured to automatically open and/or close the jaws by operating the motorised jaws of the clamp based on information received from the at least one position sensor. For example, the clamp jaws may be closed when the clamp reaches a desired clamping location.

The control system may be connected to the loads monitoring device. The control system may be configured to automatically open and/or close the jaws by operating the motorised jaws of the clamp based on information received from the loads monitoring device and/or from the tool module. For example, the magnitude of the clamping load may be sensed by the loads monitoring module and the clamp jaws may be closed until a desired clamping load is applied, whereupon the closing of the jaws is stopped. The jaws may be held in their closed position applying the desired clamping load. When the tool module communicates to the control system that an operation (e.g. drilling and fastening) has completed the control system may then direct the jaws to open (at least partially) to remove the clamping load.

The automated clamp system may further comprise a second robot arm having at least one tool module. The tool module may be positioned so as to be received by the aperture in one of the clamp jaws. The tool module may be permanently coupled to the second robot arm. Alternatively the tool module may be detachably coupled to an end effector connector of the second robot arm.

A plurality of tool modules may be carried by an adjustable tool changer on the second robot arm for selectively offering one of the plurality of tool modules to be received by the aperture in one of the clamp jaws.

The tool module and/or the adjustable tool changer may be coupled to the control system for operating the tool module and/or the adjustable tool changer. For example, the control system may control operations of the tool module, and/or the control system may control changing of tool modules of the adjustable tool changer.

The tool module may be one of a drilling module having a drilling tool or a fastening module having a fastening tool. The drilling tool may carry a drill bit. The drilling tool may be received by the aperture in the clamp jaw, e.g. the drilling tool may be captured in the collet bore. The drilling tool may be supported by the second robot.

When using the first robot to position the automated clamp based on the clamp position with respect to the wing box detected by the position sensor, the movement of the first robot may be controlled to avoid clash between the clamp and the wing box.

The method may further comprise partially closing the clamp jaws by operating the motorised jaws prior to the clamp reaching the desired clamping position to avoid clash between the clamp and the wing box when positioning the clamp.

The method may further comprises drilling a hole with the drilling module through the clamped rib web and rib post or integrated rib foot. The drill bit may be configured to pass through the aperture in one of the clamp jaws to drill into the clamped components. The other of the clamp jaws may have an aperture (e.g. a blind or through hole) into which the end of the drill bit is received having passed through the clamped components.

The method may further comprise installing a fastener in the hole with the fastening module to fasten the clamped rib web and rib post or integrated rib foot prior to removing the clamp. The fastener may be configured to pass through the aperture in one of the clamp jaws to be installed in the clamped components. The fastener may be a single sided fastener, i.e. the fastener is installed from one side of the clamped components only without requiring fastener tool access to the other side. The fastening tool may be received by the aperture in the clamp jaw, e.g. the fastening tool may be captured in the same collet bore as the drilling tool in a sequential operation. The fastening tool may be supported by the second robot.

Reference to longitudinal spar refers to a spar running along the length of the wing in a substantially spanwise direction from the wing root to the wing tip. The longitudinal spar may be substantially perpendicular to the longitudinal axis of the fuselage, although may be slightly inclined to the fuselage longitudinal axis due to, for example, the aspect ratio, twist or sweep of the wing.

Reference to terms such as upper, lower, leading edge, and trailing edge are used in reference to conventional terminology of aircraft. For instance, upper cover refers to the cover on the side of the wing in which the lift component is directed.

BRIEF DESCRIPTION OF THE DRAWINGS

Embodiments of the invention will now be described with reference to the accompanying drawings, in which:

FIGS. 7 and 8 illustrate detailed views of one of the clamp jaws;

DETAILED DESCRIPTION OF EMBODIMENT(S)

Figure 1:
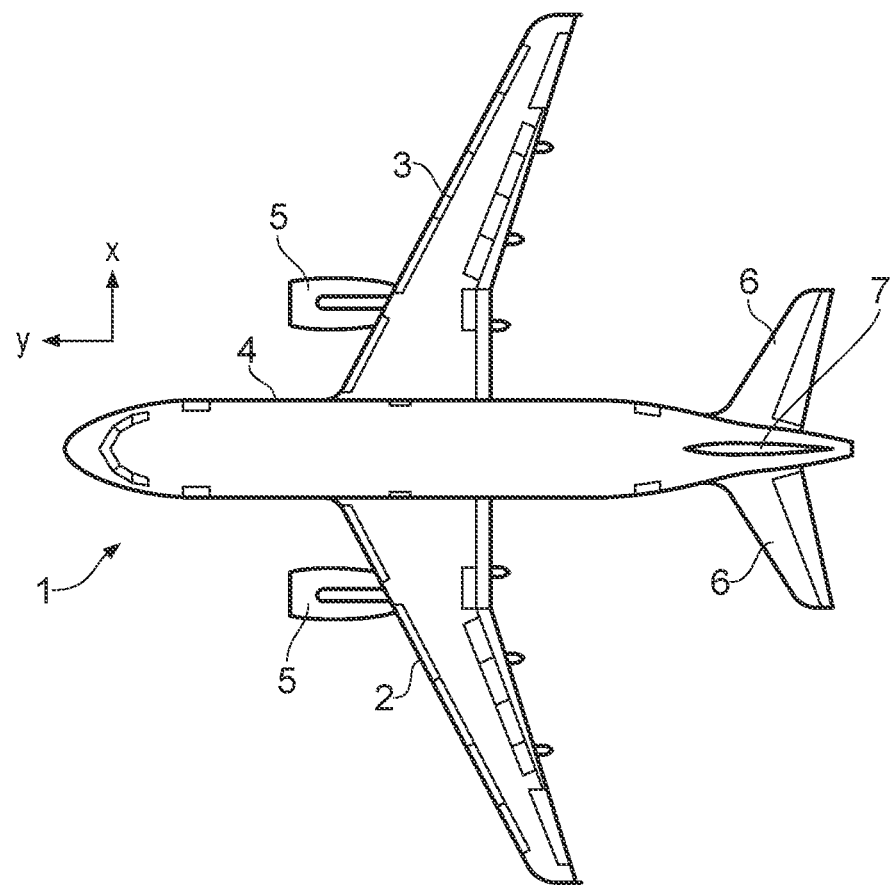
FIG. 1 illustrates a perspective view of a fixed wing aircraft.

FIG. 1 illustrates a typical configuration for a fixed wing passenger transport aircraft 1. The aircraft 1 comprises port and starboard wings 2, 3 extending from a fuselage 4, engines 5, horizontal tailplane 6 and vertical tailplane 7. It will be appreciated that this invention is applicable to a wide variety of aircraft types not just that illustrated in FIG. 1. For example, the aircraft may be for commercial or military purposes, may be for transporting passengers or cargo, may have jet, propeller or other engine propulsion systems, may have a variety of fuselage/wing configurations, e.g. a high wing, low wing, or blended wing body, and may be designed to fly at subsonic, transonic or supersonic speeds. Although the present invention is described by reference to a wing, it will be understood that the present invention may be applicable to other aerofoil shaped bodies, such a tail planes.

Each wing 2, 3 is formed as an aerofoil shaped body. Each wing has a cantilevered structure with a length extending in a spanwise direction from a root to a tip, the root being joined to an aircraft fuselage 4. Similarly, the horizontal and vertical tail planes 6, 7 are similarly arranged. Each wing 2, 3 includes a torsion box, otherwise known as a wing box. The wings 2, 3 are similar in construction so only the starboard wing 2 will be described in detail with reference to FIGS. 2 and 3.

Figure 2:
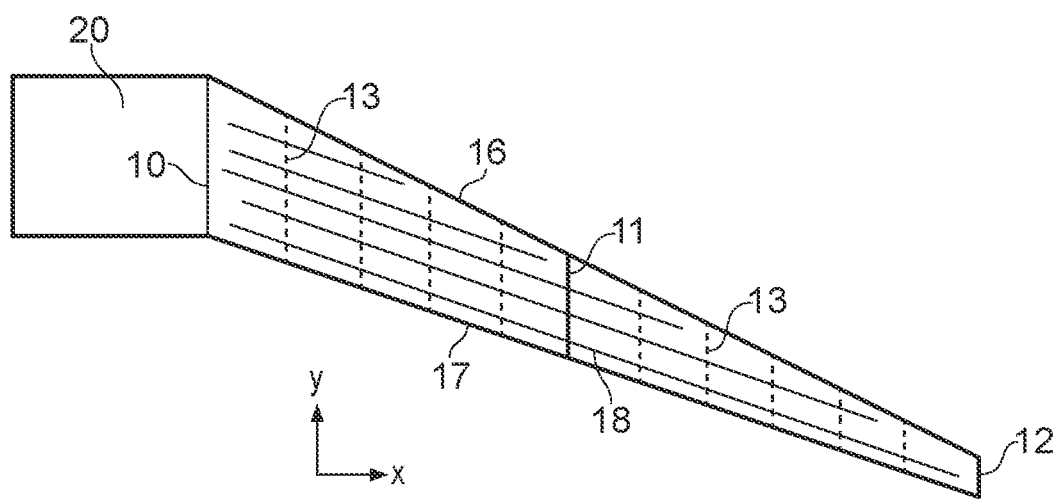
FIG. 2 illustrates a schematic plan view of a starboard wing box and centre wing box.

The main structural element of the wing is a wing box formed by upper and lower covers 14, 15 and front and rear spars 16, 7. The covers 14, 15 and spars 16, 17 are each Carbon Fibre Reinforced Polymer (CFRP) laminate components. Each cover has an aerodynamic surface (the upper surface of the upper cover 14 and the lower surface of the lower cover 15) over which air flows during flight of the aircraft. Each cover also has an inner surface carrying a series of stringers 18 extending in the spanwise direction. Each cover carries a large number of stringers 18, only five of which are shown in FIG. 2 for purposes of clarity. Each stringer 8 is joined to one cover but not the other.

The wing box also has a plurality of transverse ribs, each rib being joined to the covers 14, 15 and the spars 16, 17. The ribs include an inner-most inboard rib 10 located at the root of the wing box, and a number of further ribs spaced apart from the inner-most rib along the length of the wing box. The wing box is divided into two fuel tanks: an inboard fuel tank bounded by the inboard rib 10, a mid-span rib 11, the covers 14, 15 and the spars 16, 17; and an outboard fuel tank bounded by the mid-span rib 11, an outboard rib 12 at the tip of the wing box, the covers 14, 15 and the spars 16, 17.

The inboard rib 10 is an attachment rib which forms the root of the wing box and is joined to a centre wing box 20 within the body of the fuselage 4. Baffle ribs 13 (shown in dashed lines) form internal baffles within the fuel tanks which divide the fuel tanks into bays. The ribs 10, 11, 12 are sealed to prevent the flow of fuel out of the two fuel tanks, but the baffle ribs 13 are not sealed so that fuel can flow across them between the bays. As can be seen in FIG. 2, the stringers 8 stop short of the inboard rib 10 and the outboard rib 12, but pass through the baffle ribs 13 and the mid-span rib 11.

Figure 3:
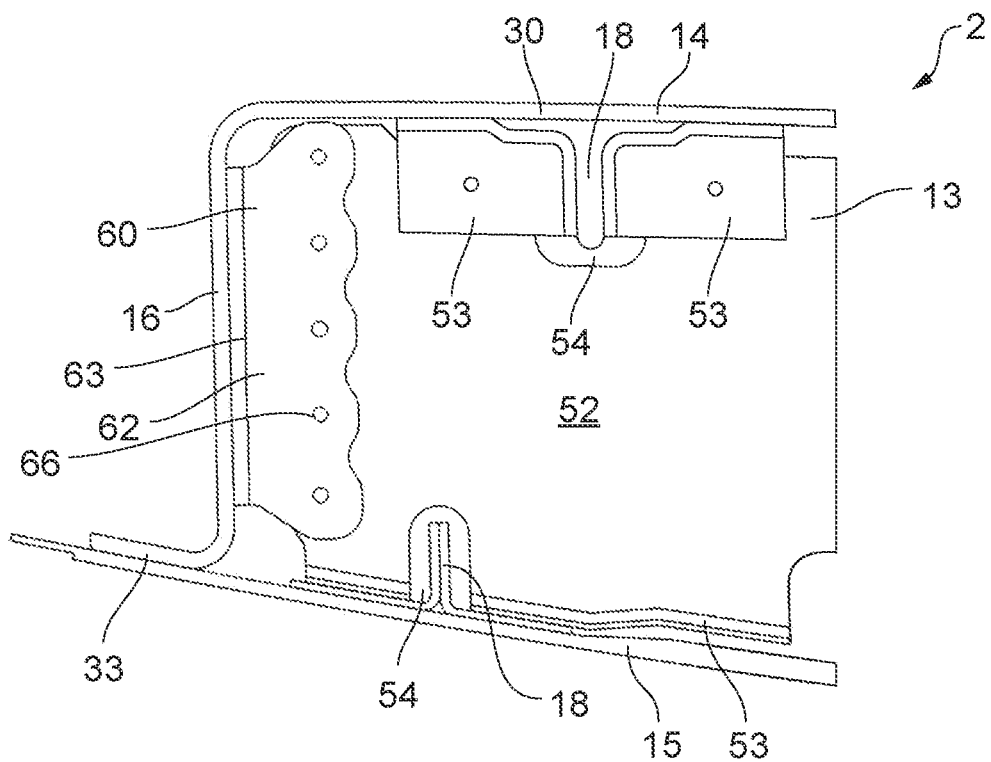
FIG. 3 illustrates a partial cross sectional side view of a forward end of the wingbox, showing the rib web, rib post and integrated rib feet.

FIG. 3 shows a cross sectional partial side view of a forward end region of the wing 2 of the aircraft 1. In the illustrated example, the wing 2 comprises a spar-cover 30 comprising the upper cover 14 and the front spar 16. However it will be appreciated that in other examples the spar and cover may be separate. The spar-cover 30 includes a lower spar flange 33. The spar-cover 30 is an integrally formed, monolithic component comprising the upper cover 14, the front spar 16, and the lower spar flange 33. The lower spar flange 33 acts as an attachment flange for mounting with the lower cover 15. The spar-cover 30 comprises fibre reinforced matrix composite laminate material, such as carbon fibre reinforced polymer. As can be seen from FIG. 3, the spar-cover 30 is substantially Z-shaped. The rear spar 17 (not shown in FIG. 3) may be substantially C-shaped with upper and lower attachment flanges for joining to the upper and lower covers 14, 15 respectively. In another arrangement, the spar-cover may be substantially Omega-shaped so as to comprise the one of the covers, and both the front and rear spars, with front and rear attachments flanges for joining to the other of the covers.

The rib 13 extends in a chordwise direction of the wing box. The rib configuration 13 extends between the front spar 16 and the rear spar 17, and between the upper cover 14 and lower cover 15. The rib 13 is joined to the front spar 16 by a rib post 60. The rib post 60 at the forward end attaches the rib 13 to the front spar 16. A corresponding rib post 60 at the rearward end of the rib 13 attaches the rib to the rear spar 17. One or more of the rib posts 60 may be integrally formed with the rib 13. The rib 13 comprises fibre reinforced matrix composite laminate material, such as carbon fibre reinforced polymer (CFRP). Although components are described herein as being formed from fibre reinforced matrix composite laminate material, such as carbon fibre reinforced polymer, it will be understood that alternative materials may be used.

The rib 13 includes a rib web 52. The rib web 52 defines the general plane of the rib 13. Rib feet 53 mount the rib 13 to the upper and lower covers 14, 15. The rib feet 53 adjacent the lower cover 15 are shown in FIG. 3 as integrally formed with the rib web 52. However, the rib feet 53 adjacent the upper cover 14 are shown in FIG. 3 as integrated with the upper cover 14 and the upper cover stringers 18, and are attached to the rib web 52, e.g. by bolting. The rib feet 53, stringers 18 and other components may be attached or co-cured to the upper and lower covers 14, 15 in various configurations.

The stringers 18 are of conventional type and so will not be described in further detail. The stringers 18 reinforce the covers, acting as spanwise extending reinforcing members, which are attached or integrally formed with the inside of the covers 14, 15. The stringers 18 extend through mouseholes 54 in the rib 13.

This invention particularly concerns the automated joining of the rib web 52 to the rib post(s) 60 and the rib feet 53 during construction of the wing box.

The rib post 60 includes a rib post web 62 and a rib post foot 63. The rib post web 62 upstands from the rib post foot 63. The rib post foot 63 extends either side of the rib post web 62. The rib post 60 is substantially T-shaped, however it will be understood that alternative shapes are possible, for example L-shaped. The rib post web 62 extends transversely from the rib post foot 63. The rib post web 62 is fixedly mounted to the rib web 52. Fasteners 66 fix the rib post web 62 with the rib web 52. The fasteners 66 are conventional and may include rivets and/or bolts. The rib post web 62 overlaps the rib web 52 and is fixed in an overlapping arrangement.

Figure 4:
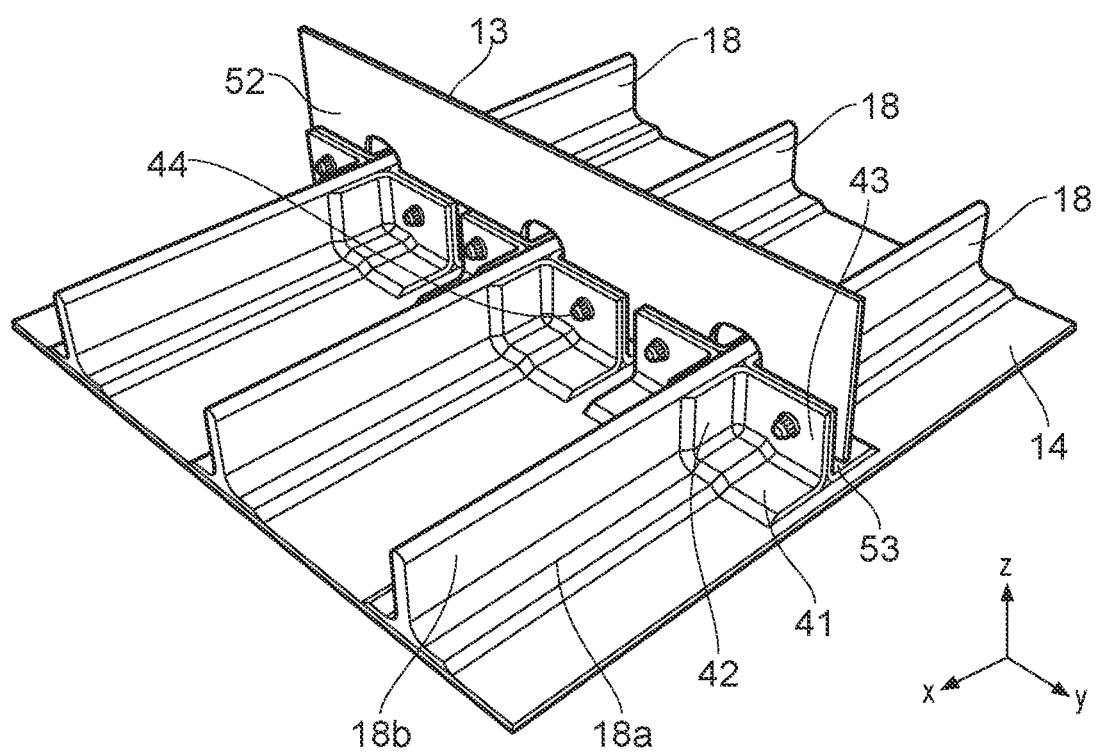
FIG. 4 illustrates a partial perspective view of a wing cover with integral stringers, integrated rib feet and the rib web.

FIG. 4 shows part of the upper cover 14 including three stringers 18. The rib 13 comprises a planar metallic web 52 connected to the upper cover by a plurality of CFRP laminate rib feet 53—six of such rib feet being shown in FIG. 4. Each rib foot 53 is formed by two mirror-symmetrical parts positioned back-to-back. Each part has a generally horizontal first flange 41; an upstanding second flange 42; and an upstanding web 43 positioned back-to-back with the web of the other part (these webs 43 being joined together back-to-back by a co-cured joint).

The first flange 41 of the rib foot is co-cured to the stringer flange 18a and inner surface of the cover 14. This co-cured joint (without bolts) between the rib foot flange 41 and the cover 14 means that no drilled bolt holes need to be provided in the cover. The second flange 42 is co-cured to the stringer web 18b, and the web 43 of the rib foot is joined to the rib web 52 by fasteners 44. The fasteners 44 are conventional and may include rivets and/or bolts. The rib foot web 43 overlaps the rib web 52 and is fixed in an overlapping arrangement.

Joining the rib web 52 to the integrated rib foot web 43 and/or to the rib post web 62 will now be described.

Figure 5:
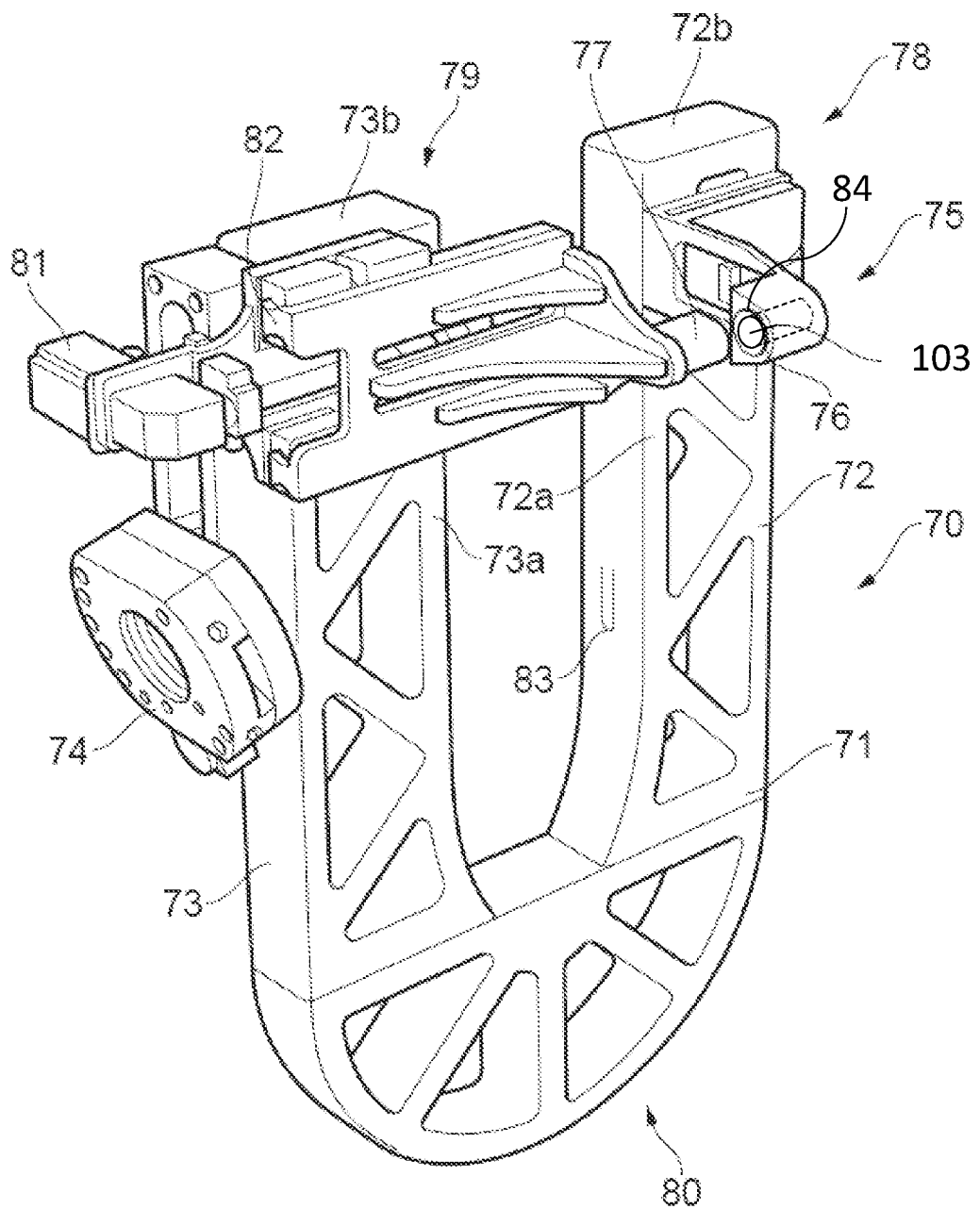
FIG. 5 illustrates a perspective view of the automated clamp in a first configuration.

FIG. 5 shows an automated clamp 70. The clamp has a clamp frame 71, which in the illustrated example is generally U-shaped. The clamp frame 71 has a first arm 72 and a second arm 73. The arms 72, 73 are generally parallel. A robot end effector connector 74 is coupled to the clamp frame 71. The end effector connector provided physical and electrical coupling of the clamp 70 to a robot as part of a clamp system. The robot end effector connector 74 provides detachable connection to the robot. Alternatively, the robot end effector connector 74 may provide a permanent connection between the clamp 70 and the robot.

The clamp 70 has a clamp jaws 75 for clamping either side of a workpiece. The clamp jaws 75 include a first jaw 76 at a proximal end 78 of the first arm 72, and a second jaw 77 at a proximal end 79 of the second arm 73. The arms 72, 73 are joined together at their distal ends 80. The distance between the arms may be sufficient to clear around rib feet of the rib during positioning of the clamp, with a margin for robot position tolerance and fixture position tolerance. The clamp includes a loads monitoring device 83 on the clamp frame, such as a strain gauge in an arm of the clamp frame. The loads monitoring device is electrically coupled via the end effector connector 74.

The first jaw 72 is fixed (not moving) with respect to the clamp frame 71. The second jaw 73 is moveable towards and away from the first jaw 72 by a motor 81 to open and close the jaws 75. The second jaw 73 is mounted on a linear rail 82 for linear movement of the second jaw 73 with respect to the clamp frame 71 to open and close the clamp jaws 75. The motor is electrically coupled via the end effector connector 74. The motor 81 (and accompanying gearbox) has a rotational axis oriented perpendicular to the linear rail 82. This helps reduce the space envelope of the clamp 70 so it can be used in confined spaces.

As best shown in FIGS. 7 and 8, the first clamp jaw 76 has a position sensing arrangement 90 built in to a head 76a of the first clamp jaw 76. The position sensing arrangement 90 includes an array of sensors for detecting a position of the clamp 70 relative to the aircraft wing box. The position sensing arrangement includes distance sensors 91, 92 for initial positioning of the clamp 70 adjacent a desired clamping location, and a vision system 93 for accurate final positioning of the clamp by detecting a datum of the component(s) to be clamped.

The distance sensors include a first distance sensor 92 oriented substantially along the longitudinal axis of the first arm 72, and a second distance sensor 91 oriented substantially transverse to the longitudinal axis of the first arm 72. The first and second distance sensors 91, 92 are therefore oriented orthogonally. The first and/or second distance sensors may be laser distance sensors. The distance sensors may be used for initial positioning of the clamp, e.g. to a global position within +/−10 mm of a desired position. For example, the first distance sensor may be configured to sense the distance of the clamp from the interior surface of the cover or the front spar. The second distance sensor may be configured to sense the distance of the clamp from the surface of the rib web.

The vision system 93 may include a camera. The vision system may include edge detection processing of images captured by the camera to locate the edge feature on a component, e.g. an edge of a rib foot, rib web or rib post. For example, as shown in FIG. 8, the vision system may look for pre-programmed edge positions 52a, 52b on the rib web 52.

Figure 6:
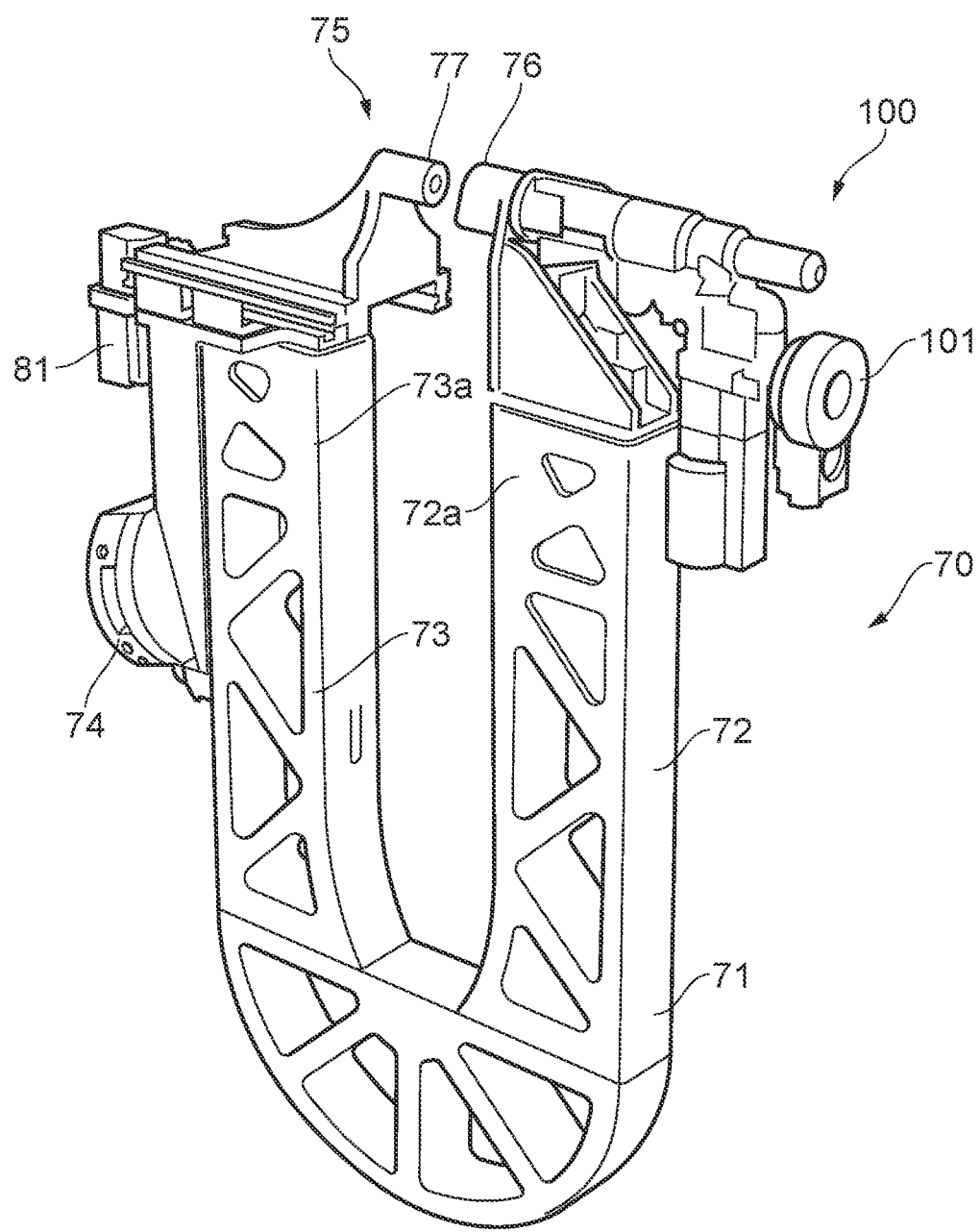
FIG. 6 illustrates a perspective view of the automated clamp in a second configuration.

The clamp jaws 76, 77 may be mounted either to side surfaces 72a, 73a or end surfaces 72b, 73b of the arms 72, 73. FIG. 5 shows the clamp 70 in a first configuration with the clamp jaws 76, 77 attached to the side surfaces 72a, 73a of the arms 72, 73. In the first configuration the jaws are laterally offset from the plane of the clamp frame 71. FIG. 6 shows the clamp 70 in a second configuration with the clamp jaws 76, 77 attached to the end surfaces 72b, 73b of the arms 72, 73. In the second configuration the jaws 75 are substantially in the plane of the clamp frame 71.

The clamp jaws 75 and the clamp frame 71 are modular so that the jaws 75 may be mounted to either the side surfaces or the end surfaces of the arms of a universal clamp frame. Reorienting the jaws on the clamp frame may assist with using the same clamp jaw and frame components for clamping a rib web to either a rib post or to a rib foot where different space constraints may apply. This reduces parts count of the assembly tooling.

In either configuration, the first clamp jaw 76 is configured to receive a tool module 100 and has an aperture 84 (best shown in FIGS. 5 and 7) through which one or more of a drilling tool and a fastening tool is insertable. The first clamp jaw 76 has locating features 85 adjacent the aperture 84 for centring and locating the dockable tool module 100.

The aperture 84 is a bore or through hole configured to receive an expanding chuck or collet 103 of the tool module 100. The tool module 100 may be one of a drilling module having a drilling tool or a fastening module having a fastening tool. The drilling tool may carry a drill bit. The drilling tool may be received by the aperture 84 in the first clamp jaw 76. The fastening tool may be received by the aperture 84 in the first clamp jaw 76.

The tool module 100 has a second robot end effector connector 101 for coupling to a second robot. The second robot end effector connector 101 provides physical and electrical connection between the tool module 100 and the second robot. The second robot end effector connector 101 provides detachable connection to the second robot. Alternatively, the second robot end effector connector 101 may provide a permanent connection between the tool module 100 and the second robot. The tool module 100 is mainly supported by the second robot and not by the aperture 84 in the clamp 70.

The tool module 100 may be a plurality of tool modules carried by an adjustable tool changer on the second robot arm for selectively offering one of the plurality of tool modules to be received by the aperture 84 in the first clamp jaw 76.

Figure 9:
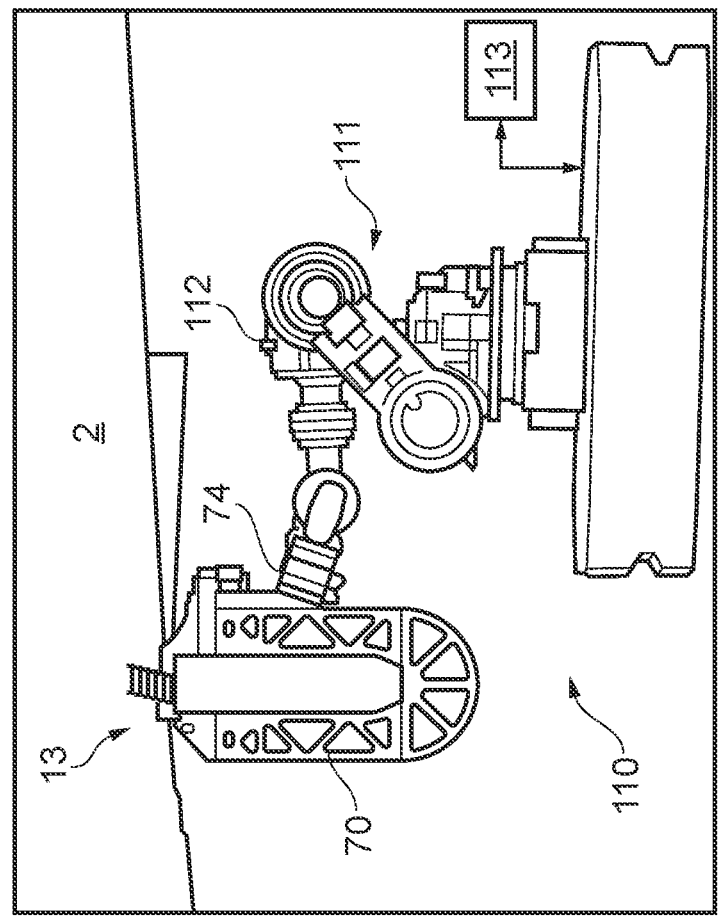
FIG. 9 illustrates the automated clamp coupled to a first robot beneath a wing box under construction.

FIG. 9 shows the clamp 70 connected as part of an automated clamp system 110 with the first robot 111 having an arm 112 coupled to the end effector connector 74 of the clamp 70, and a control system 113 for controlling the first robot 111 and the clamp 70. The control system 113 controls movement of the first robot 111 for positioning and orienting the clamp 70. The control system also controls the motor 81 for operation the motorised jaws 75 of the clamp to open and closed the jaws. The control system 113 receives input from the position sensing arrangement 90 of the clamp position with respect to a global position reference and with respect to the wing box components. The control system 113 also receives input from the loads monitoring device 83. The control system 113 receives the inputs from the clamp 70 and controls the functions of the clamp 70 via the end effector connector 74.

Using the clamp system 110 to automatically position the clamp 70 (taking the second configuration shown in FIG. 6) and automatically clamp the rib web 52 to the overlapping integrated rib foot web 43, and then to automatically drill and fasten the rib web to the rib foot web with a fastener 44.

As shown in FIG. 9, the first robot 111 moves the clamp 70 beneath the wing box of the wing 2 being constructed. The first robot 111 initially moves the clamp laterally to a lowest repeat position, or start position, where the clamp will not clash with any components of the wing box. The clamp 70 is moved to a position generally beneath one of the ribs 13 to be joined to the wing box.

Figure 10:
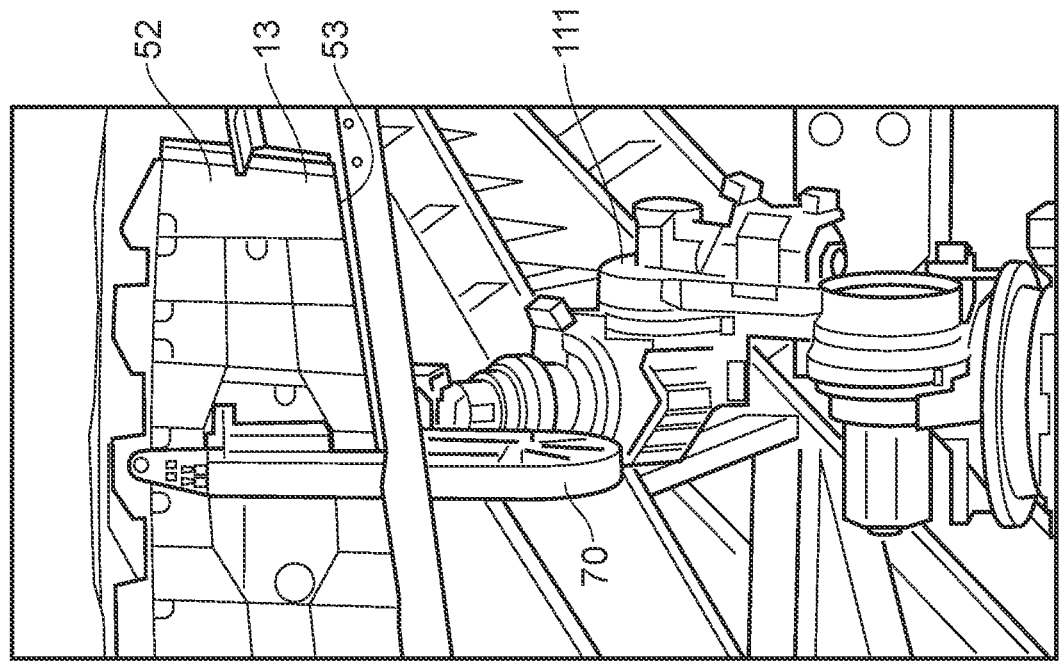
FIGS. 10 and 11 illustrate the automated clamp raised over the rib feet to a desired position adjacent a rib web/rib foot location to be clamped for drilling and fastening.
Figure 11:
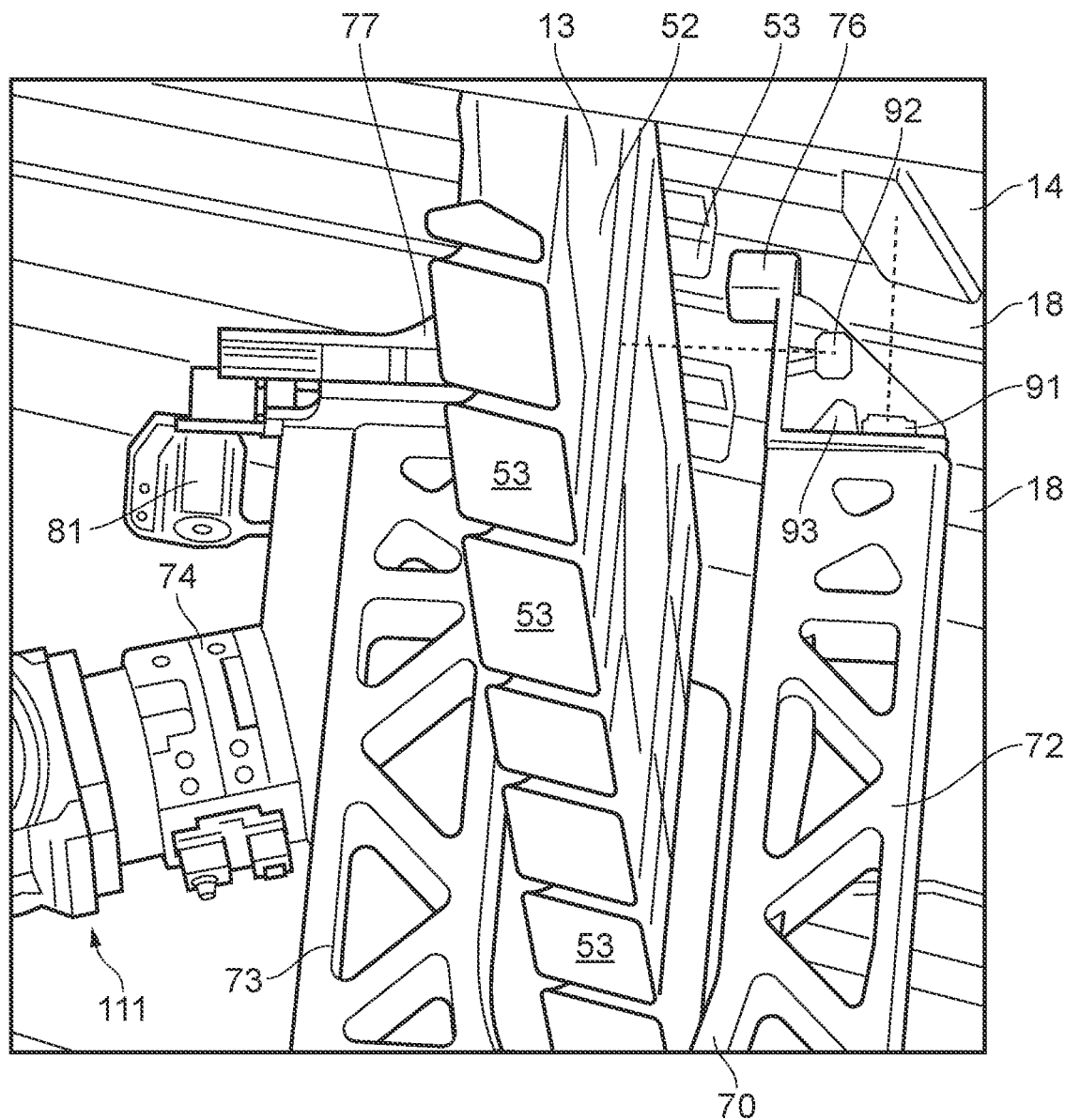

As shown in FIGS. 10 and 11, the first robot then raises the clamp 70 to an approximate global position around the rib 13. When using the first robot to position the automated clamp based on the clamp position with respect to the wing box detected by the position sensor, the movement of the first robot may be controlled to avoid clash between the clamp and the wing box. The opening of the open clamp jaws 75 is sufficiently large to fit around the rib 13, including the lower cover rib feet 53 of the rib 13 which the clamp jaws 75 must move past as the clamp 70 is raised. The lower cover rib feet 53 may be the widest part of the rib 13. The clearance of the clamp jaws 75 around the lower cover rib feet 53 should be within the tolerance of the first robot position and the fixture tolerance to ensure no clash occurs between the clamp 70 and the wing box components, this clearance may be around 15 mm either side of a nominal position.

As the first robot 111 lifts the clamp 70, the first distance sensor 92 is looking at the surface of the rib web 52 and the second distance sensor 91 is looking at the inside of the upper cover 14 of the Z spar-cover 30. The control system may be configured to automatically position the clamp frame by manipulating the robot arm based on information received from the at least one position sensor. The first distance sensor 92 looking at the surface of the rib web 52 will feedback to the control system 113 to help ensure that the first robot 111 is moving the clamp 7 vertically so that it will not clash with the rib web 52. The second distance sensor 91 looking at the inside of the upper cover 14 of the Z spar-cover 30 will communicate when to move the clamp 70 closer to the rib 13 and when the moving second jaw 77 of the clamp 70 can start winding in under the action of the motor 81 to ensure that the jaw 77 does not clash with the stringers 18. Using the inputs from the distance sensors 91, 92, the control system 113 moves the robot to position the clamp in the initial approximate global position around the rib 13 the clamp 70 to within a position tolerance of around +/−10 mm.

Once the clamp is in the region of the rib foot 53 to be clamped, the vision system 93 compares an edge feature on the clamp, e.g. an edge of a nose of one of the clamp jaws, to the edge feature 52a, 52b on the rib web 52 or on the rib foot 53 and allow the first robot 111 to adjust the position of the clamp 70 until the required positional accuracy of the clamp position is achieved at the desired clamp position.

Once the clamp 70 is in the desired clamp position the control system 113 communicates to close the clamp jaws 75 by operating the motorised jaws to clamp the rib web 52 to the integrated rib foot web 43. The magnitude of the clamping load is sensed by the loads monitoring module 83 and the clamp jaws 75 are closed until a desired clamping load is applied, whereupon the closing of the jaws is stopped. The jaws are held in their closed position applying the desired clamping load.

Figure 12:
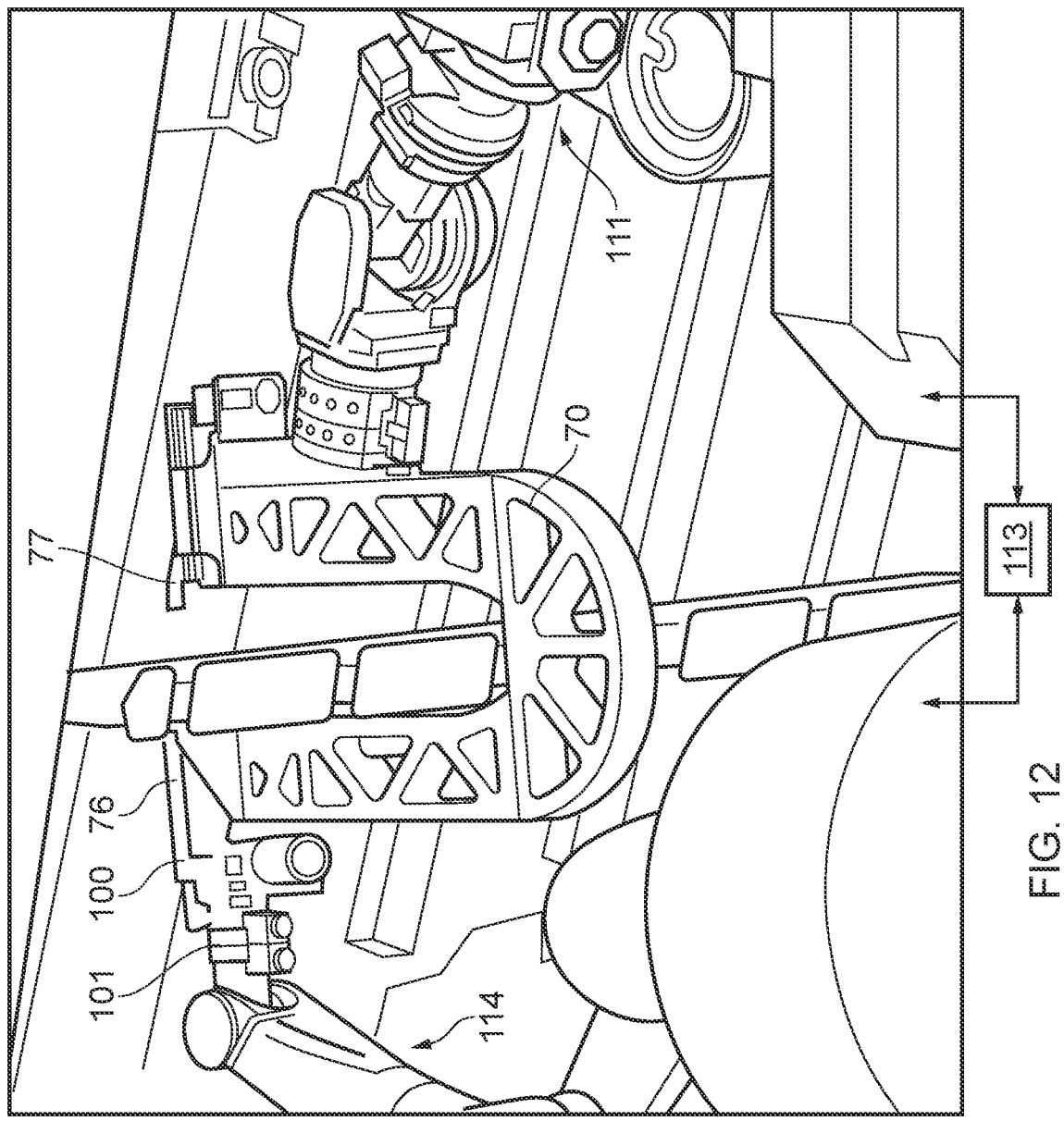
FIG. 12 illustrates a second robot having a tool module engaged with one of the clamp jaws for performing a drilling and/or fastening operation on the rib web/rib foot whilst clamped by the automated clamp.

Next, as shown in FIG. 12, the second robot 114 having the tool module 100 is docked with the first jaw 76 of the clamp 70. The second robot 114 is operated in a common control system 113 with the first robot 111. The second robot 114 positions the tool module 100 in the aperture 84 of the first clamp jaw 76, as shown in FIG. 6. The expansion and contraction of the chuck or collet of the tool module 100 to secure the tool module 100 in the aperture 84 is operated automatically by the second robot 114 under the instruction of the control system 113.

Using a drilling tool of the tool module 110, the second robot 114 drilling a fastener hole through the clamped rib web and overlapping integrated rib foot web. The drill bit (not shown) of the drilling tool passes through the aperture 84 in the first clamp jaw 76 to drill into the clamped components. The second clamp jaw 77 has an aperture (e.g. a blind or through hole) as shown in FIG. 6 into which the end of the drill bit is received having passed through the clamped components.

Once drilling of the fastener hole has completed the clamping load on the components is sustained. The second robot 114 then exchanges the drilling tool for a fastening tool. The second robot 114 may undock the tool module 100 from the clamp 70 to exchange the drilling tool for the fastening tool before re-docking. Where the drilling tool and the fastening tool are both contained in an adjustable tool changer held by the second robot 114, the second robot need not move away from the clamping location or may not undock from the clamp 70 at all. Where the second robot 114 carries only a single tool module at any time, e.g. either a drilling tool or a fastening tool, then the robot arm 114 may need to undock and be moved away from the clamp to exchange tool modules. The tool module 100 and/or the adjustable tool changer may be coupled to the control system 113 for operating the tool module and/or the adjustable tool changer. For example, the control system may control operations of the tool module, and/or the control system may control changing of tool modules of the adjustable tool changer.

Once the second robot arm 114 has docked the fastening tool with the aperture 84 of the first clamp jaw 76, a fastener 44 may be installed in the fastener hole previously drilled in the clamped components. Installing the fastener 44 in the hole with the fastening module to fasten the clamped rib web and integrated rib foot web is completed prior to removing the clamping load. The fastener may be configured to pass through the aperture 84 in the first clamp jaw 76 to be installed in the clamped components. The fastener may be a single sided fastener, i.e. the fastener is installed from one side of the clamped components only without requiring fastener tool access to the other side. The fastening tool may be captured in the same collet bore 84 as the drilling tool.

When the tool module 100 communicates to the control system 113 that the fastening operation has completed and the fastener 44 has been installed to fasten the rib web 52 to the rib foot web 43, the control system 113 then directs the jaws 75 to open (at least partially) to remove the clamping load. The tool module 100 may be undocked from the clamp 70 and moved away from the completed fastener location by the second robot 114 under the control of the control system. The clamp 70 may be moved away from the completed fastener location by the first robot 111 under the control of the control system 113.

The sequence can then be repeated to install more fasteners until all of the required fasteners 44 and 66 are installed during assembly of the wing box. It will be appreciated that the sequence for clamping the rib web 52 to the rib post web 62, drilling and installing fasteners 66 is very similar to the sequence described above. The clamp 70 for clamping the rib web 52 to the rib post web 62 will take the first configuration of the clamp shown in FIG. 5. In the first configuration, the orientation of the position sensing arrangement 90 is changed such that the second distance sensor 91 is now looking at the inside of the front spar 16 not the inside of the upper cover 14.

By maintaining the clamping load under the fully automated clamping system for clamping the components whilst the drilling and fastening operations are automatically completed, the clamp facilitates the one-way assembly objective.

It will be appreciated that various modifications may be made. For example, both clamp jaws may be moveable. The position sensing system may be on a moveable jaw of the clamp. The clamp need not be modular and separate dedicated clamps may be used for the rib post and rib foot operations. The drilling and/or fastening operations may be performed manually. Double sided fasteners may be used instead of single sided fasteners. The clamp end effector may be integrated with the robot arm so the clamp is not detachable from the robot.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An automated clamp system comprising an automated clamp for clamping a rib web to a rib post or integrated rib foot of an aircraft wing box, the automated clamp system comprising:
   a clamp, comprising:
      a clamp frame having a first arm and a second arm;
      a robot end effector connector coupled to the clamp frame;
      clamp jaws including a first jaw at a proximal end of one of the first and second arms, and a second jaw at a proximal end of the other of the first and second arms,
      wherein
         in a first configuration, the first and second clamp jaws are respectively mounted to side surfaces at the proximal ends of the first and second arms such that the jaws are laterally offset from a plane of the clamp frame bisecting each of the first and second arms, and
         in a second configuration, the first and second clamp jaws are respectively mounted to end surfaces at the proximal ends of the first and second arms such that the jaws are substantially in the plane of the clamp frame,
      wherein the clamp jaws are capable of being moved between the first configuration and the second configuration,
      wherein at least one of the clamp jaws is moveable towards and away from the other of the clamp jaws by a motor to open and close the jaws,
      wherein at least one of the clamp jaws has an aperture configured to receive a tool module,
      wherein at least one of the clamp jaws has at least one position sensor for detecting a position of the clamp relative to the aircraft wing box; and
   a robot having a first robot arm coupled to the end effector connector of the clamp,
   a second robot arm having at least one tool module, wherein the tool module has an expanding chuck or collet for securing the tool module in the aperture of one of the clamp jaws, and a control system configured to receive input from the at least one position sensor and to operate the first robot arm, the second robot arm, the motor, and the expansion and contraction of the chuck or collet of the tool module.

2. An automated clamp system according to claim 1, wherein the moveable clamp jaw includes a linear rail for linear movement of the clamp jaw with respect to the clamp frame to open and close the clamp jaws.

3. An automated clamp system according to claim 2, wherein the motor further comprises a rotational axis perpendicular to the linear rail.

4. An automated clamp system according to claim 1, further comprising a load monitoring device on the clamp frame.

5. An automated clamp system according to claim 1, wherein the at least one position sensor includes a first distance sensor oriented substantially along the longitudinal axis of the first arm.

6. An automated clamp system according to claim 1, wherein the at least one position sensor includes a second distance sensor oriented substantially transverse to the longitudinal axis of the first arm.

7. An automated clamp system according to claim 5, wherein the first distance sensor is a laser distance sensor.

8. An automated clamp system according to claim 1, wherein the at least one position sensor includes a vision system for detecting a datum of the rib post or integrated rib foot to be clamped.

9. An automated clamp system according to claim 1, wherein the aperture is a collet bore.

10. An automated clamp system according to claim 1, wherein the control system is configured to automatically position the clamp frame by manipulating the robot arm based on information received from the at least one position sensor.

11. An automated clamp system according to claim 1, wherein the control system is configured to automatically open and/or close the jaws by operating the motorised jaws of the clamp based on information received from the at least one position sensor.

12. An automated clamp system according to claim 11, wherein the control system is connected to the load monitoring device, and the control system is configured to automatically open and/or close the jaws by operating the motorised jaws of the clamp based on information received from the load monitoring device.

13. An automated clamp system according to claim 1, wherein the tool module is one of a drilling module having a drilling tool or a fastening module having a fastening tool.

14. An automated clamp system according to claim 1, wherein the first arm and the second arm are joined together at their distal ends; and the first jaw is disposed on the proximal end of one of the first and second arms, and the second jaw is disposed on the proximal end of the other of the first and second arms.

15. A method of automatically clamping a rib web to a rib post or integrated rib foot of an aircraft wing box for automated drilling and/or fastening the rib web to a rib post or integrated rib foot, the method comprising:

providing an automated clamp system for clamping a rib web to a rib post or integrated rib foot of an aircraft wing box, the automated clamp system comprising:

a clamp, comprising:

a clamp frame having a first arm and a second arm;

a robot end effector connector coupled to the clamp frame;

clamp jaws including a first jaw at a proximal end of one of the first and second arms, and a second jaw at a proximal end of the other of the first and second arms, wherein in a first configuration, the first and second clamp jaws are respectively mounted to side surfaces at the proximal ends of the first and second arms such that the jaws are laterally offset from a plane of the clamp frame bisecting each of the first and second arms, and in a second configuration, the first and second clamp jaws are respectively mounted to end surfaces at the proximal ends of the first and second arms such that the jaws are substantially in the plane of the clamp frame, wherein the clamp jaws are capable of being moved between the first configuration and the second configuration, wherein at least one of the clamp jaws is moveable towards and away from the other of the clamp jaws by a motor to open and close the jaws, wherein at least one of the clamp jaws has an aperture configured to receive a tool module, wherein at least one of the clamp jaws has at least one position sensor for detecting a position of the clamp relative to the aircraft wing box; and a robot having a first robot arm coupled to the end effector connector of the clamp, a second robot arm having at least one tool module, wherein the tool module has an expanding chuck or collet for securing the tool module in the aperture of one of the clamp jaws, and a control system configured to receive input from the at least one position sensor and to operate the first robot arm, the second robot arm, the motor, and the expansion and contraction of the chuck or collet of the tool module;

using the first robot arm to position the automated clamp, wherein the first robot arm positions the automated clamp based on a clamp position with respect to the wing box detected by the position sensor;

closing the clamp jaws by operating the motor when the clamp is in a desired position with respect to the wing box to clamp a rib web to a rib post or integrated rib foot of the aircraft wing box; and using the second robot arm to position the tool module in the aperture.

16. The method according to claim 15, wherein using the first robot arm to position the automated clamp based on the clamp position with respect to the wing box detected by the position sensor includes avoiding a clash between the clamp and the wing box when positioning the clamp.

17. The method according to claim 16, further comprising partially closing the clamp jaws by operating the motor prior to the clamp reaching the desired clamping position to avoid a clash between the clamp and the wing box when positioning the clamp.

18. The method according to claim 15, wherein the tool module is a drilling module and the method further comprises drilling a hole with the drilling module through the clamped rib web and rib post or integrated rib foot.

19. The method according to claim 15, wherein the tool module is a fastening module and the method further comprises installing a fastener in the hole with the fastening module to fasten the clamped rib web and rib post or integrated rib foot prior to removing the clamp.

* * * * *